United States Patent [19]

De Feo et al.

[11] 4,306,875

[45] Dec. 22, 1981

[54] SALTS OF BASIC DYES, PREPARATION AND USES OF SAME

[75] Inventors: Francesco De Feo, Milan; Adelio Basilico, Cogliate, both of Italy

[73] Assignee: Aziende Colori Nazionali Affini ACNA S.p.A., Milan, Italy

[21] Appl. No.: 175,598

[22] Filed: Aug. 5, 1980

[30] Foreign Application Priority Data

Aug. 10, 1979 [IT] Italy ............................... 25061 A/79

[51] Int. Cl.$^3$ ............................................ C09B 67/00
[52] U.S. Cl. ........................................ 8/471; 8/506; 8/539; 8/550; 8/584; 8/630; 8/648; 8/657; 8/661; 8/919; 106/22
[58] Field of Search ................... 8/630, 471, 539, 654, 8/655, 657, 497, 506, 550; 106/22

[56] References Cited

U.S. PATENT DOCUMENTS

| | | | |
|---|---|---|---|
| 3,969,071 | 7/1976 | Hugelin | 8/630 |
| 4,057,388 | 11/1977 | Defago et al. | 8/630 |
| 4,245,990 | 1/1981 | Loew | 8/582 |

FOREIGN PATENT DOCUMENTS 747583  8/1970  Belgium .

*Primary Examiner*—A. Lionel Clingman
*Attorney, Agent, or Firm*—Morgan, Finnegan, Pine, Foley & Lee

[57] ABSTRACT

This invention relates to novel dye salts of basic dyes or basic optical brighteners and anionic esters of boric acid. The invention also includes the preparation of the aforementioned novel dye salts.

13 Claims, No Drawings

SALTS OF BASIC DYES, PREPARATION AND USES OF SAME

BACKGROUND OF THE INVENTION

It is known that basic and cationic dyes are water soluble in their conventional salified form, and that their isolation from the mother liquors of the reaction occurs, in particular in the case of dyes having a high solubility in water, through chlorzincate and/or salting with NaCl. The washing is always carried out with brine, wherefore the dyes always contain a more or less high percentage of NaCl.

The term "basic dyes" means the dyes described in Colour Index 3rd ed. A.A.T.C.C., 1st Vol., page 1507 et seq., under the generic name "C.I. Basic Dyes". The term "basic optical brighteners" means the one described in the 2nd vol., page 2743 et seq., under the generic name "C.I. Fluorescent Brighteners" and characterized by cationic ionicity.

There are few known and applicable lacquers of basic and cationic dyes owing to the difficulty of obtaining water-insoluble salts or complexes, which are capable of retaining unchanged the brightness of the starting dyes and which possess good general stabilities and retain unaltered or even improve the fastness to light of the starting dye on certain substrata, in which the starting dye has low stabilities to sunlight, for example substrata other than polyacrylonitrile fibres.

Lacquers having a good fastness to sunlight and good general stabilities such as phosphomolybdic, phosphotungstomolybdic lacquers of basic and cationic dyes are actually known.

It is also known that the borates of cationic dyes described in Belgian Pat. No. 747,583, besides requiring a complicated synthesis and providing low yields, are more soluble in water than the ones salified with the inorganic anions usually obtained from the conventional syntheses.

It is known too that certain anionic complexes of boric acid and the salts thereof possess a better solubility in water than the starting products, for example the water-solubility of calcium gluconate is increased up to about ten times by complexing with boric acid (Merck Index, 7th Ed. page 193), wherefore it could not be expected, from these 2 examples, to obtain water-insoluble salts from anionic esters of boric acid with basic dyes.

OBJECTS OF THE INVENTION

It is an object of this invention to obtain novel water-insoluble salts of basic dyes or basic optical brightness having a high degree of purity.

Another object of this invention is to obtain novel water-insoluble salts of basic dyes or optical brighteners having a high dyeing or brightening strength.

It is another object of this invention to obtain salts of basic dyes (including also the basic optical brighteners) endowed, according to the structure of the dye or optical brightener used, with a good solubility in the organic solvents and particularly in the organic polar and aprotic dipolar solvents. In this manner their applicability is extended to the field, in which dyes classified by Colour Index as Solvent Dyes are used.

A further object of this invention is to provide a process for dyeing polyacrylonitrile fibres and synthetic modified acid fibres using the novel dye salts of this invention.

A still further object of this invention is to provide a process for transfer printing on fabrics made of acrylonitrile polymers or copolymers or of acid-modified synthetic fibres employing the novel dye salts of this invention.

Another object of this invention is to provide a process for colouring plastic materials, enamels, lacquers and printing inks using the novel dye salts of this invention.

Another object of this invention is to provide processes for the dyeing of paper and the colored coating of laminates employing the novel dye salts of this invention.

GENERAL DESCRIPTION OF INVENTION

It has been surprisingly found that the objects of the invention may be realized by obtaining salts of anionic esters of boric acid with basic dyes or with basic optical brighteners having general formula (I):

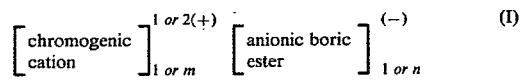

wherein the cation is represented by the residue of a basic or cationic dye or of a basic or cationic optical brightener, the boric esters employable according to this invention being represented by the following structures:

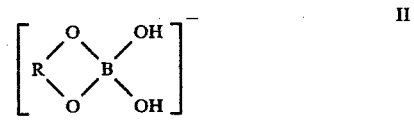

II

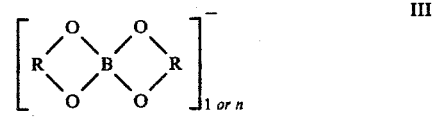

III

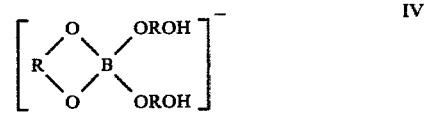

IV wherein R is the residue of an aliphatic alpha, beta-diol or of an aromatic orthodiol which can be further substituted; or the residue of an aliphatic alpha-hydroxy-carboxylic acid or of an aromatic ortho-hydroxy-carboxylic acid, which can be further substituted.

An optional bond between 2 radicals R, either of the direct type or of the bridge-type, gives place to polymeric chains.

n=an integer indicating the units contained in the polymer >1 m=an integer ≦n

Of course, due to the possibility, existing in certain cases and in certain conditions of pH or of temperature, of having equilibriums in which one or more forms of anionic boric ester with partial dissociation of the acid reagent may exist, possible mixtures of salts of anionic boric esters and/or of hydroxyacid with the basic dye do not beyond the object of the present invention provided they possess the characteristic of being insoluble in water and soluble in polar solvents as well as in aprotic dipolar solvents.

The dye of the cation may belong to any chemical class, for example it may be a methinic, azamethinic, azoic, anthraquinone, phthalocyaninic, quinophthalonic, naphthostyrylic, azinic, oxazinic, xantenic dye, provided it is a cationic chromogenic dye having, for example, at least 1 group N+, S+, P+, 0+, or provided it has at least 1 proton-accepting aminic group or in any case a group with basic ionization.

Anionic boric esters are described in literature, for example in Houben-Weyl: vol. VI/2, page 177 and foll., and in particular, from page 221 to page 226, the ones prepared in aqueous solutions and stabler.

Anionic boric esters can be prepared, for instance, by reacting boric acid or a salt or a derivative thereof in water or in a polor solvent with an aliphatic alpha, beta-diol or with a cycloaliphatic alpha, beta-cis-diol or with an aromatic ortho- or peri-diol or with an aliphatic alpha-hydroxy-carboxylic acid or an aromatic ortho-hydroxy-carboxylic acid.

These reagents can be optionally substituted by groups other than $SO_3H$ or having a basic ionization, but which are capable of imparting to their physical characteristics certain modifications suited to optimize the use.

For example, the substituting halogen and $NO_2$ groups can impart a higher insolubility in water; alkyls $C_{1-18}$, alkoxyls $C_{1-4}$, COOR (R=an alkyl $C_{1-4}$, an aralkyl $C_{1-2}$, an aryl) can impart a better solubility in the organic solvents; groups CONHR, $CONH_2$, $CONR_2$, $SO_2R$, $SO_2NR_2$ (R=as specified hereinbefore) can impart a higher insolubility in the non-polar organic solvents or a lesser migrability in the plastic materials (all these properties are useful to impart higher stabilities in the various applications).

Finally, two or more residues of these reagents can be linked with one another, to provide polymeric anions, either by a direct bond or by a bridge, which, as already explained hereinabove, can serve to modify the physical properties of the salts of this invention, such properties depending on the chemical structure both of the cation and of the anion.

In particular, for example, the following bridges can be useful to this purpose: —$CH_2$—, alkylene $C_{1-4}$, cycloalkylene, alkylidene $C_{1-4}$, arylalkylidene $C_{1-2}$, —O—alkylene $C_{1-4}$—O—, —S—, —$SO_2$—, —CO—, —NHCONH—, —NHCOO— and —NHCOR-CONH— (R=alkylene $C_{1-6}$, arylene).

As aliphatic alpha-, beta-diols or as cycloaliphatic alpha, gamma-cis-diols, the following ones, for example, can be used: 2,4-dimethyl-2, 4-pentadiol, cis-1, 2-cyclohexandiol, cis-1, 3-cyclohexandiol.

As o-hydroxycarboxylic acids the following ones can be used:

salicylic acid
3-hydroxy-2-naphthoic acid
5,5'methylene-bis-salicylic acid
4,4'-methylene-bis-(3-hydroxy-2-naphthoic)acid (pamoic acid)
2,3-dihydroxybenzoic acid
2,4-dihydroxybenzoic acid(beta-resorcylic acid)
2,5-dihydroxybenzoic acid
2,6-dihydroxybenzoic acid (gamma-resorcylic acid).

As aromatic ortho-or peri-diols, the following ones can be used: pyrocatechin and derivatives thereof, pyrogallol and derivatives thereof, ortho- and peri-naphthalenediols such as 1,8-dihydroxynaphthalene, 2,3-dihydroxynaphthalene and 1,2-dihydroxynaphthalene.

As aliphatic alpha-hydroxycarboxylic acids the following can be used: lactic acid, citric acid, tartaric acid, malic acid and glycolic acid.

All these anionic boric esters can be prepared both in water and in organic polar or aprotic dipolar solvents by mixing of the reagents and/or heating from room temperature to 100° C. in the presence or in the absence of the chromogenic cation, or in the presence or absence of an inorganic cation, or of an organic base, or of ammonia and its derivatives.

Furthermore it is possible to have concentrated mother solutions in water, or in polar organic or dipolar aprotic solvents of the anionic boric ester in the acid form or in the form of a salt with an inorganic cation or with an organic base or with ammonia and its lower aliphatic derivatives.

This does not exclude from the object of the present invention the anionic boric esters prepared according to other methods, for example those described in Houben-Weyl (l.c.), The preparation of the salt with a basic dye can be effected, according to the cases, in various manners, which can be optimized depending on the chromogenic cation employed or on the anionic boric ester utilized, for example by double exchange between the solution of the cationic dye salified with a conventional anion and the solution of the anionic boric ester salified with an alkaline metal or with ammonia or its lower aliphatic derivatives.

The solutions used to effect the double exchange may be aqueous solutions or aqueous solutions containing polar organic or dipolar aprotic solvents mixable with water, or one of the two solutions, for example the one of the dye, is prepared with said organic solvents.

However, at the end of the precipitation reaction by double exchange, namely dilution with the aqueous solution of the anionic boric ester and/or possible dilution with water, the solvent must not be in such percentages as to hinder the salt precipitation or, in any case to cause losses in the isolated product yields, i.e. the solvent amounts must not exceed 20—30% approximately.

The double exchange reaction can be carried out at temperatures ranging from 0° to 100° C., more in particular from 20° to 80° C., optionally in the presence of auxiliary matters or of surfactants or of wetting agents.

At any rate the salts according to this invention can be prepared also in loco, i.e. at the conclusion of the synthesis of the basic dye, without having to isolate such dye.

For example, in the case of (aza) methinic dyes, the salt of the anionic boric ester can be directly obtained from the synthesis by carrying out the condensation, in a polar or dipolar aprotic solvent, of Fischer aldehyde with an aromatic or cycloaromatic amine at a temperature of from 0° C. to 50° C. in the presence of reagents suited to form the anionic boric ester, namely boric acid and $R(OH)_2$ (R having the same meaning specified for II, III and IV).

At the conclusion of the reaction it is possible to obtain a precipitate which is filtered, washed with the same solvent and dried, the mother solution being optionally recycled; or the reaction mass can be diluted with water or with another solvent in which the salt is insoluble or little soluble; finally it is possible to obtain a solution suitable for being directly applicated.

Possible groups COOH, for example deriving from a basic dye such as Rodamine B, which cause a certain undesired solubility, can be salified, as the end of the operation, for example with an alkaline-earth metal in order to complete the precipitation.

In accordance with this invention it is possible to obtain solutions in polar or dipolar aprotic solvents having such a tinctorial concentration as to render them suited to be used as mother solutions in the various applications of said salts.

Such solutions can be prepared either from the salt already isolated and dried by dissolution of the salt in a proper solvent, or during the synthesis of the dye itself, or by double exchange in a solvent when the synthesis of the dye occurs in a solvent and when, in any case, there are no impurities which may render the final application unsuited.

The solvents employable to obtain these concentrated solutions of salts according to the present invention are organic polar solvents, aprotic dipolar solvents, and mixtures thereof optionally also with non-polar solvents in such amounts, as not to affect the stability thereof, for example aliphatic alcohols, glycols, esters of alcohols and of glycols, diglycols, polyglycols, ketones, lactones, dialkylamides and aliphatic amides, ethers of glycols, and mixtures thereof with one another or with solvents such as benzene, toluene, xylene or halogenated hydrocarbons.

The salts of the present invention are employed, for example, in the processes for dyeing polyacrylonitrile fibres and synthetic modified acid fibres because, though water-insoluble in cold conditions, when once they are mixed with acetic or formic acid and, optionally, with a polar solvent or an aprotic dipolar solvent, they dissolve in the dyeing bath.

They normally fix on the fibre and dye it with stabilities to sunlight and to sublimation equal to those of the corresponding and conventionally salified dye.

Furthermore the affinity at high intensity and therefore the saturation index are similar to those of the type.

Another application consists in the transfer printing carried out by dissolving these salts, having a high tinctorial concentration, in the inks for printing the paper, which then transfers the dye to the fabric; in the transfer printing on fabrics made of polyacrylonitrile fibres or of synthetic acid-modified fibres said dye must also have the property of ionically "binding" to the acid groups of the fibre and, by consequence, it must have fastness properties like the ones of the dyes used in the conventional printing.

The processes for transfer printing known so far made use of the so-called bases or anhydrous bases or carbinol bases of the basic or cationic dye, or in any case a non-salified chromogenic cation (see British Pat. Nos. 1,404,441; 1,432,505; 1,429,584; 1,428,073; 1,428,074, etc.).

However, due to the instability of the above-mentioned bases, drawbacks and difficulties arose both in the preparation of the inks and in finding transfer supports not subject to alterations.

It is known too that such drawbacks were obviated by printing the support with an ink containing a conventionally salified dye which formed a first layer, whereon a second ink layer containing an alkaline substance was applicated, so that the aforesaid base extemporaneously liberated during transfer (see British Pat. No. 1,477,324). Also this process, however, exhibits some drawbacks as regards the stability of the inks and the reproduceability of the printing.

Another process is the one described in French Pat. No. 2,336,461 which discloses the use of dyes or of lacquers of dyes insoluble in the solvent contained in the ink, always using a layer of colored ink and a layer of alkaline ink.

The Applicant has now surprisingly found that by using the salts of the present invention not only it is possible to obtain inks with the conventional polar and non-polar solvents (used to this purpose), in which the high-tinctorial yield dye is perfectly dissolved and stable to ageing also after application on a transfer support but also that the dye transfers on the fabric so providing printings having general stabilities similar to those of the conventional printings, that being achieved by applicating one layer only and without using alkaline substances.

In the transfer printing the final result also depends on the stability to heat of the dyeing cation; this results from a shade alteration already on the ink support after the transfer printing.

This instability to heat depends on the chemical structure of the dyeing cation, and an indication thereof is given by the stability of the intermediate dye to prolonged boiling and to pH in the conventional exhaust dyeing.

Another application of the salts of the present invention—due to their good stability in the aromatic dipolar solvents, and to their good purity degree, since they are free from inorganic salts—consists in the mass dyeing of polyacrylonitrile with dyes soluble in the solvents from which the fibre is spun.

It is known that the acrylonitrile polymers and copolymers are mass-dyed with pigments which require, however, particular finishings owing to the possibility of their clogging the holes of the spinnerets.

It is known too that the acrylonitrile polymers and copolymers can be mass dyed with lacquers of heteropolyacids with basic dyes (French Pat. No. 1,068,382) or with salts of sulphonic acids of basic dyes (German Pat. No. 1,077,372), but these dyes have a dyeing strength limited by the molecular weight of the colourless anion which lowers the dyeing strength.

It is known as well that it is possible to mass-dye said polymers and copolymers with dyes having basic groups and being protonated by the acid groups of the fibre (German Pat. Nos. 2,359,466 and 2,711,328), or also with salified basic dyes of certain chemical classes (German Pat. No. 2,413,299).

While the dyes of the first two patents, because of their being free from groups with a highly cationic charge, may give a more or less marked bleeding depending on the tinctorial concentration in the coagulation baths of the wet spinning, the dyes of the last patent can be prepared only with the basic dyes from which it is possible to obtain a carbinol base or a stable anhydrobase, the latter being in its turn salified in an organic solvent which is then removed.

It is therefore quite unexpected and surprising to ascertain that the present invention permits to obtain dyeing salts free from inorganic salts which could clog the spinnerets, offering the following advantages:

(1) they can be prepared from any chemical class of dyes and basic optical brighteners;

(2) their tinctorial concentration is always remarkably higher than the one required to achieve the purpose of the mass-dyeing;

(3) they provide complete solutions in dipolar aprotic solvents;

(4) they are capable of mass-dyeing acrylonitrile polymers and copolymers with regular stability characteristics and with very low bleeding characteristics in the coagulation bath.

A further application of the present invention consists in the mass-dyeing of the plastic materials, where the salts of this invention perfectly dissolve and/or disperse with excellent stabilities to sunlight and to the processing temperatures.

Such plastic materials may be, for example, polystyrene, polyethylene, rigid or plasticized PVC, melaminic resins, phenolformaldehyde resins, polyacrylates and polyurethanes.

Still another application of this invention is the use of the salts in the printing lacquers and inks of various types, for example solvent and water flexographic inks, off-set and rotogravure printing inks, as well as inks for ball pens, inking pads, etc.

The inks can be fluorescent or not, depending on the basic dye employed in the synthesis of the salt.

Owing to the water-insolubility of the salts of the basic dyes of the present invention, another application consists in he use of same in the mass-dyeing of paper, where, in respect of the water-soluble basic dyes, they offer the following advantages: colourless waste waters, exploitation of the whole tinctorial concentration employed, the decolourability of the cellulose regeneration remaining unchanged, as it depends on the structure of the dyeing cation employed.

SPECIFIC DESCRIPTION OF THE INVENTION

The following examples are given for merely illustrative purposes, without being however a limitation of the present invention. Unless otherwise specified, the parts are expressed by weight. The maximum absorbance a max expressed in 1/g/cm has been determined by mixing the salt of the anionic boric ester with 1 ml of acetic acid, by diluting with 50 ml of ethanol or acetone and then by diluting to volume with water.

EXAMPLE 1

Preparation of Sodium Boron Salicylate in Water (boric acid/salicylic acid ratio=1:2)
4000 parts of water,
556 parts of salicylic acid at 99.3% (4 moles),
124.4 parts of boric acid at 99.4% (2 moles)
400 parts of a NaOH solution at 30% parts by weight (3 moles) were introduced into a beaker equipped with a stirrer and a thermometer; the mass was heated under stirring to 50°-60° C., whereupon 133 parts of the NaOH solution at 30% parts by weight (1 mole) were dropped thereinto to bring the pH to 7; finally the solution was diluted with water till obtaining 5000 parts by vol. (5 l) and was allowed to cool under stirring.

EXAMPLE 2

Preparation of Sodium Boron Salicylate in Water (Boric acid/salicylic acid ratio=1:1)
3000 parts of water,
278 parts of salicylic acid at 99.3% (2 moles),
124.4 parts of boric acid at 99.4% (2 moles)
200 parts of NaOH solution at 30% parts by weight (1.5 moles)

were charged into a beaker equipped with a stirrer and a thermometer; the mass was heated to 50°-60° C. under stirring and 66.6 parts of NaOH solution at 30% parts by weight (0.5 moles) were dropped thereinto to bring the pH to 7, finally the solution was diluted with water till obtaining 4000 parts by volume (4 l) and was cooled under stirring.

EXAMPLE 3

150 parts of Cellosolve,
12.3 parts of p-anisidine at 100% (0.1 mole),
22.6 parts of Fischer aldehyde (1,3,3-trimethylindolineacetaldehyde),
27.6 parts of salicylic acid at 99.9% (0.2 moles),
6.2 parts of boric acid at 99.8% (0.1 moles)

were charged in succession, under stirring, into a reactor. The solution was kept under stirring at a temperature of 20°-25° C. After about 1 hour an abundant amount of precipitate was obtained, which was further stirred for about 15 minutes, whereupon it was filtered, washed with 50 parts of methyl alcohol and dried at 60° C. under vacuum.

Obtained were: 55.1 parts (93.2% of the theoretical value) of the salt of the dye corresponding to the cation of C.I. Basic Yellow 13, having melting point of 218°-220° C. (not corrected), $\lambda_{max}=411$, $\epsilon=45,813$, $a_{max}=77.6$ 1/g/cm. (Spectrophotom. titre 243% in respect of the hydrochloride of the type at 100% = a spectrophotometric yield of 106.2%).

EXAMPLE 4

Into a reactor the following was charged:

60 parts of ethyl acetate,
14 parts of methyl alcohol and, under stirring,
15.4 parts of 2,4-dimethoxyaniline at 99.2% (0.1 mole),
21.5 parts of Fischer aldehyde at 93.5% (0.2 moles),
6.2 parts of boric acid at 99.8% (0.1 mole).

The reagents were dissolved by stirring at room temperature and after about 30 minutes the salt of the dye began to precipitate. It was stirred for about 1 hour, then it was filtered under vacuum and washed with 27 parts of ethyl acetate and the resulting cake was dried at 50° C. under vacuum.

It was possible to obtain 48 parts (77.4% of the theoretical value) of salt of the dye corresponding to the cation of C.I. Basic Yellow 11 having a melting point=147°-150° C. (not corrected), $\lambda_{max}=409$, $a_{max}=64.1$ 1/g/cm, $\epsilon=40152$ (spectrophotom. yield=92.5% in respect of the conventional hydrochloride).

EXAMPLE 5

1200 parts of ethanol,
304 parts of 2,4-dimethoxyaniline (2 moles),
428 parts of Fischer aldehyde at 93.8% (2 moles),
144 parts of acetic acid (3.4 moles)

were introduced in succession into a reactor; it was then stirred at room temperature for 3 hours, so obtaining a dye solution which was poured, in about 2 hours at room temperature, into a solution obtained by dissolving at 50°-60° C.:

556 parts of salicylic acid (4 moles),
124 parts of boric acid (2 moles) in 5000 parts of water containing
266 parts of a 36° Be NaOH solution (2 moles),
brought to a pH=6.5–7 with 202 parts of a 36° Be NaOH solution (1.52 moles) and diluted with 10,000 parts of water at 15° C.

At the conclusion of the pouring it was further stirred for 1 hour, then it was filtered, washed with water till removal of salts and impurities, and dried under vacuum at 55°–60° C.

At the conclusion of the pouring it was further stirred for 1 hour, then it was filtered, washed with water till removal of salts and impurities, and dried under vacuum at 55°–60° C.

It was possible to obtain 948 parts of salt of the dye corresponding to the cation of C.I. azamethinic Basic Yellow 11 having a melting point=97°–104° C. (spectrophotometric yield =108.4% in respect of the conventional hydrochloride), $\lambda_{max}=417$, $a_{max}=71.93$ l/g/cm.

EXAMPLE 6

60 parts of methyl alcohol,
24.6 parts of p-anisidin at 100% (0.2 moles),
42.8 parts of Fischer aldehyde at 94% (0.2 moles)

were charged under stirring into a reactor. The resulting solution was then cooled to about 0° C., and at such temperature 14.4 parts of glacial acetic acid were poured dropwise thereinto in about 30 minutes.

The solution was kept under stirring until the temperature reached the room temperature, then the solvent was evaporated under vacuum at 35°–40° C.

The precipitate so obtained was dissolved in about 1400 parts of water at 80° C., adding an amount of acetic acid sufficient to bring to pH value to 5.5.

The resulting solution was dropped, in about 1 hour and under stirring, into 500 ml of a stock solution of sodium boron salicylate 1:2 (prepared as in example 1) and maintained at approximately 40° C. At the conclusion of the dropping stirring was continued till reaching the room temperature, then it was filtered under vacuum, the cake was washed with water and dried at 50° C. under vacuum. Obtained were 97 g (82.2% of the theoretical value) of salt of the dye corresponding to the cation of C.I. Basic Yellow 13, having a melting point=210°–213° C. (not corrected), $\lambda_{max}=410$, $a_{max}=55.86$ l/g/cm.

EXAMPLE 7

Into a reactor the following was charged:

400 parts of water,
10 parts of glacial acetic acid;
it was heated to 45°–50° C. and 33 parts of a dye corresponding to C.I. Basic Yellow 29 (azamethinic) were added under stirring, whereupon it was heated to said temperature till complete dissolution. The resulting solution was added, in about 1 hour at a temperature of 20°–22° C., to 260 parts by volume of a sodium boron salicylate solution (about 0.1 mole) prepared according to example 1 and diluted with 250 parts of water (final pH=4.5–5).

At the conclusion of the reaction it was stirred for about 30 minutes, then it was filtered, washed with water till complete removal of inorganic salts, and dried at 60° C. under vacuum. It was possible to obtain 46 parts of salt of the dye corresponding to the cation of C.I. Basic Yellow 29 (azamethinic), with a spectrophotometic yield of 99.6% and having $\lambda_{max}=428$, $a_{max}=69.1$ l/g/cm, a melting point=168°–171° C.

EXAMPLE 8

1250 parts of water,
19 parts of glacial acetic acid,
0.75 parts of nonylphenol-polyoxyethylenate were introduced in succession into a reactor. It was heated to 80° C. and at such temperature 22.2 parts of dye C.I. Basic Blue 69 (71.8 parts of commercial dye at 30.9% of purity) (0.05 moles) were added under stirring, going on heating till complete dissolution. The solution so obtained was dropped, in about 3 hours at a temperature of 50°–55° C., into 150 parts by volume of a 1:2 sodium boron salicylate solution (0.05 moles) prepared according to example 1, diluted with 600 parts of water and maintained at 50° C. At the conclusion of the reaction it was filtered, the precipitate was washed till absence of Cl$^-$ and SO$_4^{2-}$ and dried under vacuum at 60° C.

33 g of the salt of the dye corresponding to the cation of C.I. Basic Blue 69 (naphthostyrylic) were obtained; weighted yield=96%, melting point=96°–97° C. (corrected), $\lambda_{max}=600$; $a_{max}=600$; $a_{max}=50.2$ l/g/cm.

EXAMPLE 9

60 parts of dimethylacetamide,
12.3 parts of p-anisidin,
21.5 parts of Fischer aldehyde,
40 parts of 1-methylene-bis-3- hydroxy-2-naphthoic acid at 97%,
6.2 parts of boric acid were introduced in the order, at room temperature and under stirring, into a reactor.

After a 2-hour stirring at room temperature the reaction was concluded and a dimethylacetamide solution was obtained, which could be used as such.

In order to isolate the salt so obtained, said solution was dropped into 500 parts of water containing 5 parts of glacial acetic acid.

The precipitate was filtered, washed with water and dried at 60° C. under vacuum.

It was possible to obtain 70 g (weighted theoretical yield) of the salt of the cation corresponding to the dye C.I. Basic Yellow 13 having a melting point=238°–245° C., $\lambda_{max}=418$, $a_{max}=42.2$ l/g/cm.

EXAMPLE 10

120 parts of methyl alcohol,
21.4 parts of p-amino-benzene-sulphonacetamide (0.1 mole),
21.5 parts of Fischer aldehyde at 93.5% (0.1 mole)

were introduced in succession, under stirring, at room temperature, into a reactor.

After obtainment of the solution, 27.6 parts of salicylic acid at 99.9% (0.2 moles) and 6.2 parts of boric acid at 99.8% (0.1 mole) were charged.

After about 30 minutes an abundant amount of salt was obtained. It was stirred for further 30 minutes at room temperature, it was filtered under vacuum, the cake was washed with about 160 parts of methyl alcohol and was dried under vacuum at 60° C.

64 parts of the salt of the condensation azamethinic dye (yield=94% by weight) were obtained; melting point=227°–231° C., $\lambda_{max}=411$, $\epsilon=58,229$, $a_{max}=85.5$ l/g/cm.

EXAMPLE 11

75 parts of Cellosolve,
15.4 parts of 2,4-dimethoxyaniline at 99.2% (0.1 mole),
21.4 parts of Fischer aldehyde at 94% (0.1 mole),
27.6 parts of salicylic acid (0.2 moles),
6.2 parts of boric acid (0.1 mole)

were introduced in succession, under stirring, at room temperature, into a reactor.

It was stirred for about 1 hour at a temperature of 25° C., so obtaining a solution of the salt of the dye cation of C.I. Basic Yellow 11, having $\lambda_{max}=411$, $a_{max}27.3$ l/g/cm and ready for being utilized in the dyeing of paints and flexographic inks.

EXAMPLE 12

By operating according to example 7, but only substituting C.I. Basic Yellow 29 by C.I. Basic Blue 65 (a delocalized-charge azo dye), it was possible to obtain the bis-salicylateborate of the dye cation of C.I. Basic Blue 65, having a melting point=73°–77° C., $\lambda_{max}=613$, $a_{max}=84.6$ l/g/cm.

EXAMPLE 13

By operating as in example 7, but substituting C.I. Basic Yellow 29 by C.I. Basic Red 18 ( a localized-charge azo dye) and the boron salicylate solution by the one of example 2, it was possible to obtain the monosalicylate-borate of the dye cation of C.I. Basic Red 18, having a melting point=205°–208° C., $\lambda_{max}=472$, $a_{max}=53.9$ l/g/cm.

EXAMPLE 14

By operating according to example 7, but substituting only C.I. Basic Yellow 29 by C.I. Basic Red 18 (a localized-charge azo dye), it was possible to obtain the bis-salicylate-borate of the dye cation of C.I. Basic Red 18, having a melting point=110°–113° C., $\lambda_{max}=471$, $a_{max}=47.4$ l/g/cm.

EXAMPLE 15

By operating according to example 7, but substituting only C.I. Basic Yellow 29 by C.I. Basic Yellow 11 (an azamethinic dye), it was possible to obtain the bis-salicylate-borate of the dye cation of C.I. Basic Yellow 11, which was practically like the one of example 4 and exhibited a melting point=143°–148° C., $\lambda_{max}=411$, $a_{max}=58.5$ l/g/cm.

EXAMPLE 16

By operating as in example 4, but substituting only the salicylic acid by the same molar ratio of 3-hydroxy-2-naphthoic acid, it was possible to obtain the bix-(3-hydroxy-2-naphthoic) borate of the dye cation of C.I. Basic Yellow 11, having a melting point=138°–144° C., $\lambda_{max}=411$, $a_{max}=53.6$ l/g/cm.

Example 17

By operating according to example 4, but substituting only the salicylic acid by the same molar ratio of pyrocatechin, it was possible to obtain the bis-pyrocatechinate-borate of the dye cation of C.I. Basic Yellow 11, having a melting point=176°–179° C., $\lambda_{max}=411$, $a_{max}=69.2$ l/g/cm.

EXAMPLE 18

By operating according to example 4, but adding salicylic acid and boric acid in the same molar ratios during the last stage of preparation of the dye C.I. Basic Blue 3, the bis-salicylate-borate of the dye cation C.I. Basic Blue 3 was obtained, which exhibited a melting point=108°–110° C., $\lambda_{max}=653$, $a_{max}=173.2$ l/g/cm.

EXAMPLE 19 (Transfer printing)

3 inks containing respectively
2, 5 and 7 parts of dye corresponding to 100% of the spectrophotometric titre, dissolved in a vehicle containing 8 parts of Ethylcellulose No. 4
2 parts of Ethylcellulose No. 7
27 parts of ethyl acetate
63 parts of denatured ethyl alcohol having a viscosity determined in a FORD cup No. 4=16″, were prepared.

A paper support was printed with these inks, whereupon such support was contacted for 30 seconds with a polyacrylonitrile fabric (having 35 microequivalents of strong acid groups/gram), respectively at 160°, 190° and 210° C.

The printings so obtained exhibited properties of stability to light, washing and rubbing comparable with those of the same basic dye applied in exhaust dyeing.

The salts of the basic dyes described in the preceding examples 4, 5 and 8 were employed according to this technique.

EXAMPLE 20 (Mass Dyeing)

3 solutions at 20% parts by weight of the salts of the anionic boric ester of the basic dyes respectively described in examples 4, 5 and 15, in dimethylacetamide were prepared.

From each solution, portions of 2.5, 5 and 7.5 parts were drawn, which were then mixed with 400 parts of a 25% solution of an acrylic polymer containing 15 microequivalents of strong acid groups/g in dimethylacetamide.

These concentrations were calculated so as to never have a saturation of the acid groups of the polymer.

The employed amounts of 2.5, 5 and 7.5 parts corresponded respectively, for the salt of example 4, to tinctorial concentrations of 1.4, 2.8 and 4.2% (referred to the polymer weight) of the dye at 100% dyeing strength; for the salt of example 5, to tinctorial concentrations of 1.68, 3.36 and 5.04% (referred to the polymer weight) of the dye at 100% dyeing strength; and for the salt of example 15, to tinctorial concentrations of 1.3, 2.6 and 3.9% (referred to the polymer weight) of the dye at 100%. All the three salts of examples 7, 5 and 15 were salts of the boric ester of the salicylic acid salified with the dye cation of C.I. Basic Yellow 11, but prepared in a different way.

The coloured solutions did not contain undissolved particles which could clog the holes of the spinnerets.

The nine solutions at different dyeing strengths were wet spun according to conventional techniques.

The spinning properties, such as yield, pressure and stretch were similar to the ones of the spinning of the colourless polymer. The dyed yarn so obtained exhibited a yellow shade greenisher and purer than the one obtained by a conventional dyeing, with properties of stability to light, dry cleaning and moist washing at 40° and 60° C., to perspiration and rubbing comparable with the ones of the conventional exhaust dyeings obtained by using the same salified dyeing cation of the conventional type. Furthermore the bleeding properties in the coagulation bath during the wet spinning resulted improved as compared with those of a dye having a not quaternized tertiary aminic group applicated, in the mass dyeing, to the same dyeing concentration.

EXAMPLE 21 (Colouring of Plastic Materials)

The salts of the dyes were mixed with the polymer powders, calendered and then conventionally moulded.

The salts were used at the following concentrations:

0.1 and 0.2% for polyethylene,
2% for the mass tone in polyvinyl chloride plus dilution with TiO$_2$
0.1 and 0.2% for polystyrene.

For polyethylene the salts of examples 3, 4 and 9, having good properties of diffusion and general stabilities, were used. For polystyrene, the salts of examples 3, 4, 9, 10, having excellent properties of diffusion and fastness to light, were used. For polyvinyl chloride, the salt of example 9, having good general properties, was used.

Shades varying from reddish yellow to greenish yellow were obtained. The samples dyed with the salt of example 10 exhibited a very greenish yellow shade with an intense fluorescence.

EXAMPLE 22 (Flexographic ink)

A flexographic ink was prepared with the salt of example 4 at 5% in a nitrocellulose base containing polar and non-polar solvents.

A yellow ink having a remarkable transparency and a high gloss was obtained, the yield being comparable to the one of a conventional comparative pigment.

EXAMPLE 23 (Mass-dyeing of Paper)

A dispersion in water at 30% parts by weight of the salt of example 4 was prepared by grinding such salt for 30 minutes, in a Kottoff apparatus using plastic microballs, in an aqueous medium containing the usual additives such as dispersants, wetting agents, stabilizers.

Said dispersion was gradually admixed to bleached cellulose during the cooling step in a hollander.

The results were comparable to the ones obtained with a dispersion at 5% of conventional polymer.

The waste waters were colourless, the yield referred to the polymer was 90:100, with the advantage that cellulose was recyclable by decolouring the salt with hypochlorite.

What we claim is:

1. New dye salts insoluble in water but soluble in polar organic and dipolar aprotic solvents, comprised in the general formula:

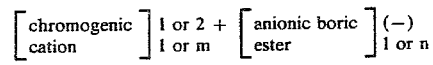

in which
the name chromogenic cation indicates a radical of an organic dye or of an optical brightener containing at least a basic-ionization group,
n is an integer, higher than 1 indicating the structural units contained in the polymer of the boric ester,
m is an integer not exceeding n.

2. New dye salts insoluble in water but soluble in polar organic and dipolar aprotic solvents according to claim 1, characterized in that the chromogenic cation belongs to the classes of the di- and triphenylmethanic, methinic, quinophthalonic, anthraquinonic, phthalocyaninic, azamethinic, azoic, naphthostyrylic, azinic, oxazinic, xantenic dyes or optical brighteners containing at least a basic-ionization group.

3. New dye salts according to claims 1 and 2, characterized in that the basic-ionization group is an aminic protonaccepting group or ions N+, S+, P+ and O+.

4. New dye salts insoluble in water but soluble in polar and dipolar aprotic solvents, according to claim 1, characterized in that the boric ester is selected from the group consisting of the esters having general formulas:

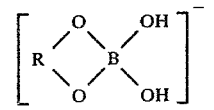

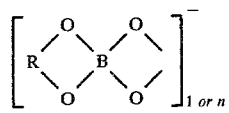

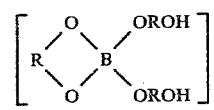

wherein R is the residue of an aliphatic alpha, beta-diol, of an aromatic ortho-diol or of an aliphatic alpha-hydroxy-carboxylic acid or an aromatic orthohydroxycarboxylic acid, which can be further substituted by non-ionic groups, and n has the meaning specified in claim 1.

5. A process for preparing the dye salts of claims 1 or 2, characterized in that a solution of a dye or of an optical brightener containing at least one basic-ionization group, is reacted by a double exchange reaction with a solution of an anionic boric ester salified with an alkaline metal or with ammonia or its organic derivatives.

6. A process for preparing the dye salts of claims 1 or 2, wherein the dye or brightener has been salified with a conventional anion.

7. A process according to claim 5, characterized in that the solutions utilized to effect the double-exchange reaction are aqueous solutions.

8. A process according to claim 5, characterized in that the solutions employed to effect the double-exchange reaction are aqueous solutions containing polar organic or dipolar aprotic solvents miscible with water.

9. A method of dyeing acid-modified acrylonitrile polymers or copolymers or acid-modified synthetic fibers which comprises the addition of the dye salts of claim 1 to the dissolved polymer prior to spinning.

10. A method for effecting transfer printing on fabrics made of acid-modified acrylonitrile polymers or copolymer or acid-modified synthetic fibers by the use of the dye salts of claim 1.

11. A method for coloring plastic materials, enamels, lacquers and printing inks by the use of the dye salts of claim 1.

12. A method of dyeing paper by the use of the dye salts of claim 1.

13. Acid-modified acrylonitrile polymers or copolymers or synthetic materials dyed with the dye salts of claim 1.

* * * * *